(12) United States Patent
Yoon et al.

(10) Patent No.: US 12,496,888 B2
(45) Date of Patent: Dec. 16, 2025

(54) BATTERY ASSEMBLY

(71) Applicants: Hyundai Motor Company, Seoul (KR); Kia Corporation, Seoul (KR)

(72) Inventors: Seok Eun Yoon, Seoul (KR); Yu Ri Oh, Hwaseong-Si (KR); In Gook Son, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 276 days.

(21) Appl. No.: 18/369,999

(22) Filed: Sep. 19, 2023

(65) Prior Publication Data
US 2024/0343103 A1 Oct. 17, 2024

(30) Foreign Application Priority Data
Apr. 12, 2023 (KR) .................. 10-2023-0048131

(51) Int. Cl.
| | | |
|---|---|---|
| B60K 1/04 | (2019.01) | |
| B60L 50/64 | (2019.01) | |
| H01M 50/249 | (2021.01) | |
| H01M 50/264 | (2021.01) | |
| B60L 50/60 | (2019.01) | |

(52) U.S. Cl.
CPC ............... *B60K 1/04* (2013.01); *B60L 50/64* (2019.02); *H01M 50/249* (2021.01); *H01M 50/264* (2021.01); *B60K 2001/0438* (2013.01); *B60L 50/66* (2019.02); *H01M 2220/20* (2013.01)

(58) Field of Classification Search
CPC ... B60K 1/04; B60K 2001/0438; B60L 50/64; B60L 50/66; H01M 50/249; H01M 50/264; H01M 2220/20
See application file for complete search history.

(56) References Cited

U.S. PATENT DOCUMENTS

| | | | | |
|---|---|---|---|---|
| 2017/0305249 A1* | 10/2017 | Hara | .................. | B62D 25/2036 |
| 2022/0169312 A1* | 6/2022 | Park | ..................... | B62D 21/152 |

FOREIGN PATENT DOCUMENTS

| | | | | |
|---|---|---|---|---|
| EP | 3536530 A1 * | 9/2019 | ........... | B62D 21/155 |
| KR | 10-2021-0001334 | 1/2021 | | |

* cited by examiner

*Primary Examiner* — Edwin A Young
(74) *Attorney, Agent, or Firm* — Morgan Lewis & Bockius LLP

(57) ABSTRACT

A battery assembly includes a housing in which a battery module is accommodated, members dividing an internal space of the housing, a through pipe penetrating the inside of each of the members on one point of the member, and a through bolt inserted into the through pipe.

18 Claims, 9 Drawing Sheets

BATTERY ASSEMBLY

CROSS REFERENCE TO RELATED APPLICATIONS

The present application claims priority to Korean Patent Application No. 10-2023-0048131, filed Apr. 12, 2023, the entire contents of which is incorporated herein for all purposes by this reference.

BACKGROUND OF THE PRESENT DISCLOSURE

Field of the Present Disclosure

The present disclosure relates to relates to a battery assembly mounted on an electric or hybrid vehicle.

Description of Related Art

An electric vehicle and a hybrid vehicle are provided with a high-voltage battery (hereinafter referred to as "a battery assembly"). In most cases, the battery assembly is mounted on the lower portion of a vehicle to improve the stability, driving performance, and internal space efficiency of the vehicle.

Meanwhile, to improve the driving performance and fuel efficiency of a vehicle, it is recognized as an important task to increase the ratio of battery capacity to weight by eliminating unnecessary components or reducing the size thereof in the battery assembly.

By reducing the size of a member dividing space in which battery modules are received, the ratio of battery capacity to weight may be increased, and in the case of a vehicle in which an auxiliary battery is provided, the size of the auxiliary battery may be reduced, making it easy to install the auxiliary battery in a leftover space in a vehicle body.

However, there is a problem that the reduction of the member affects the size and rigidity of a through pipe that vertically penetrates the member of the battery assembly.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery assembly in which the size of a member may be reduced to increase the ratio of battery capacity to weight and secure space for mounting an auxiliary battery.

To achieve the objectives of the present disclosure, there is provided a battery assembly including: a housing including an internal space in which a battery module is accommodated; a plurality of members dividing the internal space of the housing into a plurality of spaces: a through pipe penetrating inside of each of the members on one point of the member; and a through bolt inserted into the through pipe, wherein the through pipe includes: a first through member penetrating the inside of the member to be fastened to the member and including a first internal peripheral surface formed on an upper end portion of the first through member; a second through member being fastened to the first internal peripheral surface of the first through member and including a second internal peripheral surface formed on an upper end portion of the second through member, with a width of the second internal peripheral surface being greater than a width of the first internal peripheral surface; and a third through member fastened to the second internal peripheral surface of the second through member.

A seating surface on which a head of the through bolt is accommodated may be formed on at least one of a lower end portion of the first through member and an upper end portion of the third through member, and the through bolt may be inserted into the through pipe to first penetrate one of the first through member and the third through member.

A first external peripheral surface fastened to the member may be formed on the upper end portion of the first through member.

A second external peripheral surface including a width smaller than the width of the second internal peripheral surface may be formed on a lower portion of the second through member to be fastened to the first internal peripheral surface of the first through member.

The second external peripheral surface may be formed on the lower portion of the second through member, and a third external peripheral surface having a width greater than the width of the second external peripheral surface may be formed on a lower portion of the third through member to be fastened to the second internal peripheral surface of the second through member.

An upper cover covering the battery module may be provided between the second through member and the third through member.

Threads may be formed on the first internal peripheral surface of the first through member and the second internal peripheral surface of the second through member.

The first through member, the second through member, and the third through member may be coupled to each other to form the through pipe.

According to the battery assembly of the present disclosure, the size of a member may be reduced, increasing the ratio of battery capacity to weight and securing space for mounting an auxiliary battery on a vehicle body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
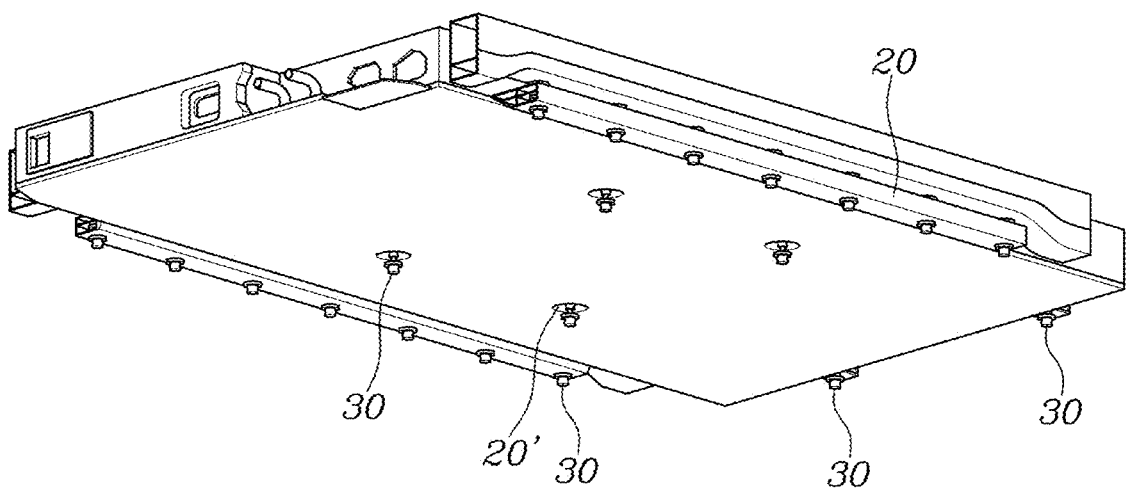
FIG. 1 illustrates the lower surface of a battery assembly.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below: While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereafter, an exemplary embodiment of the present disclosure will be described in detail with reference to the accompanying drawings and the same or similar components are provided the same reference numerals regardless of the numbers of figures and are not repeatedly described.

In the following description, if it is decided that the detailed description of known technologies related to the present disclosure makes the subject matter of the exemplary embodiment described herein unclear, the detailed description is omitted. Furthermore, the accompanying drawings are provided only for easy understanding of the exemplary embodiment included in the specification, and the technical spirit included in the specification is not limited by the accompanying drawings, and all changes, equivalents, and replacements should be understood as being included in the spirit and scope of the present disclosure.

Terms including ordinal numbers such as "first" and "second", etc. may be used to describe various components, but the components are not to be construed as being limited to the terms. The terms are used only to distinguish one component from another component.

Singular forms are intended to include plural forms unless the context clearly indicates otherwise.

It will be further understood that the terms "comprise" or "have" used in the present specification specify the presence of stated features, steps, operations, components, parts, or a combination thereof, but do not preclude the presence or addition of one or more other features, numerals, steps, operations, components, parts, or a combination thereof.

It is to be understood that when one element is referred to as being "connected to" or "coupled to" another element, it may be directly connected to or directly coupled to another element or be connected to or coupled to another element, including the other element intervening therebetween. On the other hand, it should be understood that when one element is referred to as being "directly connected to" or "directly coupled to" another element, it is connected to or coupled to another element without the other element intervening therebetween.

FIG. 1 illustrates a lower surface of a battery assembly.

The battery assembly mounted on an electric vehicle is a set of battery modules, and each of the battery modules is a set of battery cells. The battery assembly may include a cooling system for cooling the battery modules, and a battery managing system (BMS) for diagnosing and controlling the state of the battery modules, etc. In addition to the battery modules Meanwhile, the battery assembly 10 is mainly mounted on the lower portion of a vehicle body. The battery assembly 10 may be mounted on the vehicle body by inserting a through bolt 30 into a mounting portion 20 formed on the external surface of the battery assembly 10.

In the instant case, in addition to the mounting portion 20 formed on the external surface of the battery assembly 10, a mounting portion 20' is formed on the internal surface of the battery assembly, and thus a through bolt 30 is inserted into the mounting portion 20', so that the mounting of the battery assembly 10 may be more secure.

Figure 4:
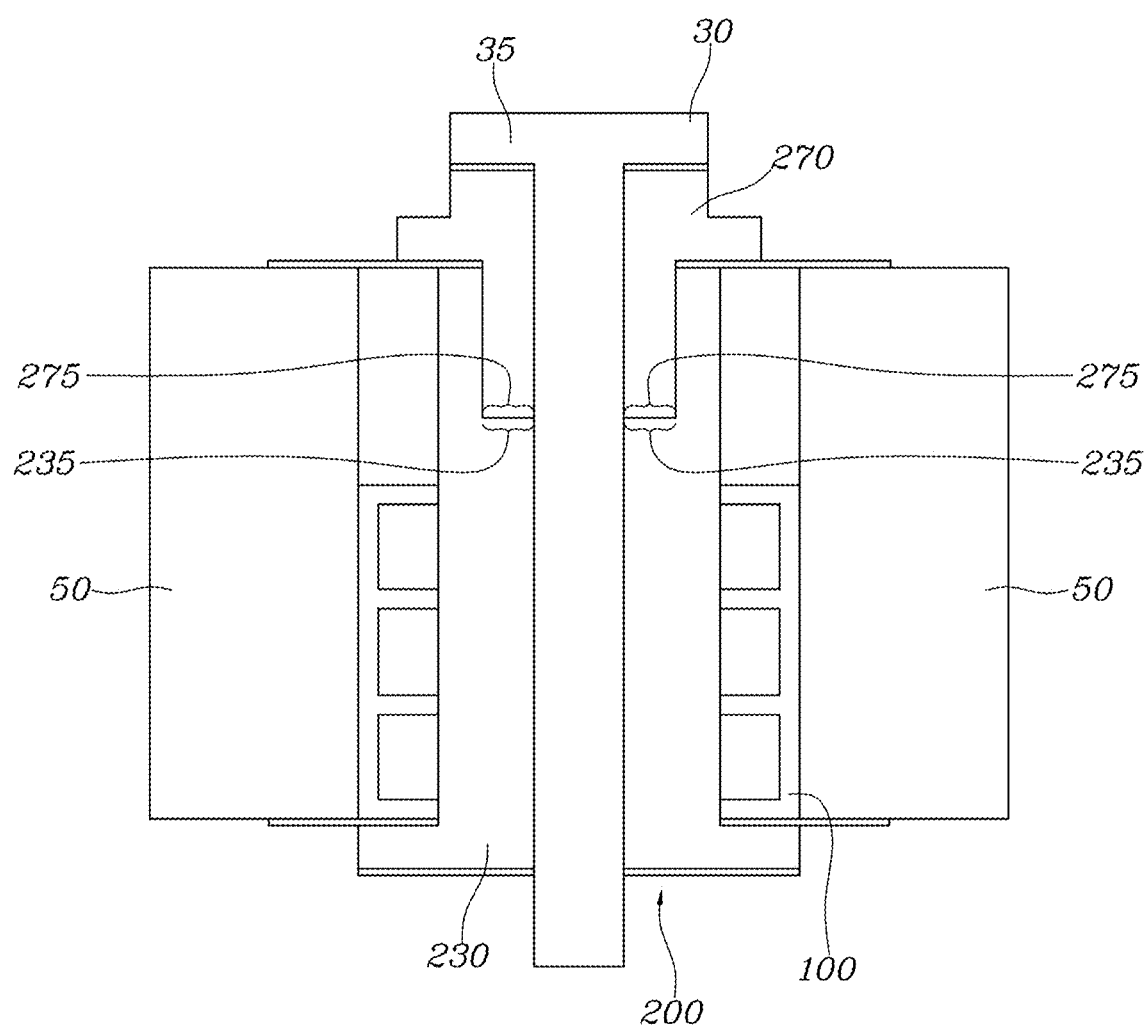
FIG. 4 illustrates a cross-section taken along line A-A' of FIG. 3.
Figure 5:
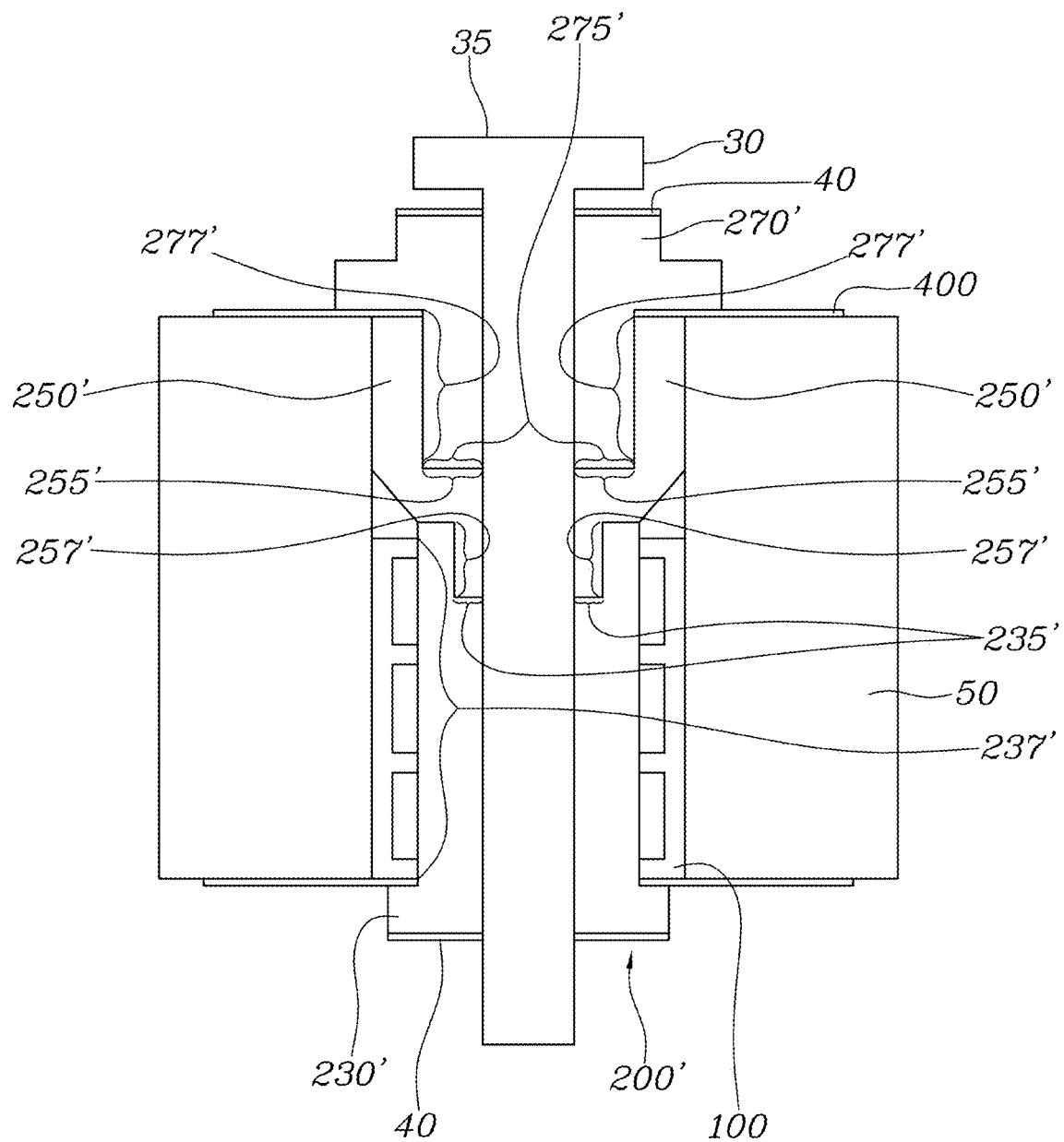
FIG. 5 is a cross-section of the battery assembly according to an exemplary embodiment of the present disclosure.
Figure 6:
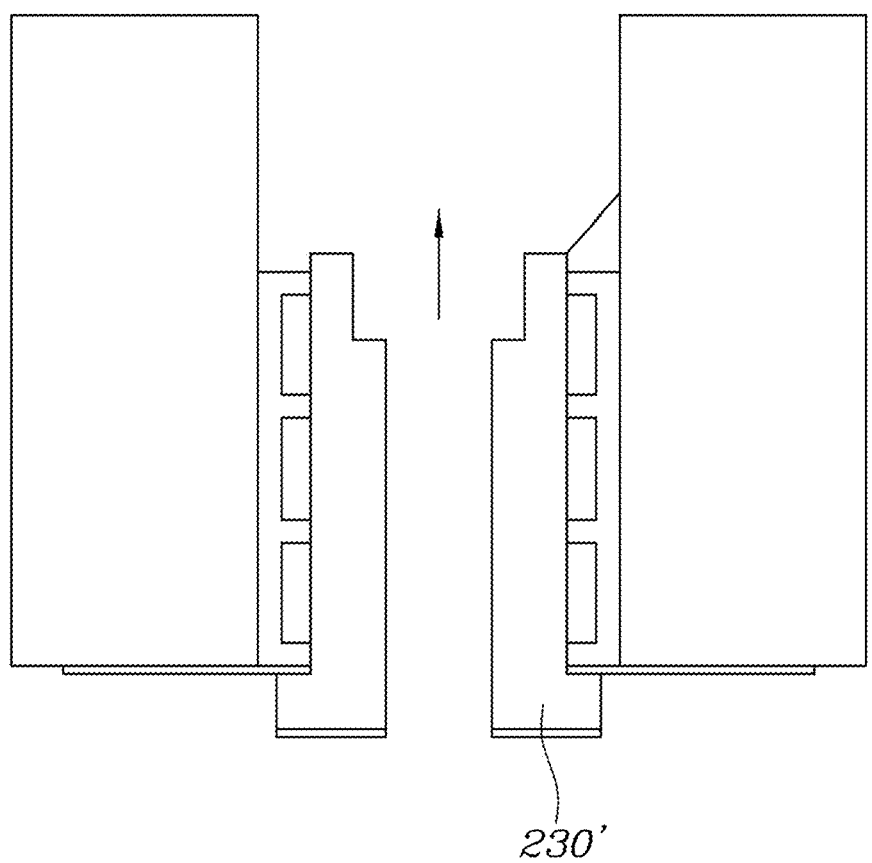
FIG. 6, FIG. 7, FIG. 8, and FIG. 9 illustrate the assembly process of a through pipe according to the exemplary embodiment of the present disclosure.
Figure 7:
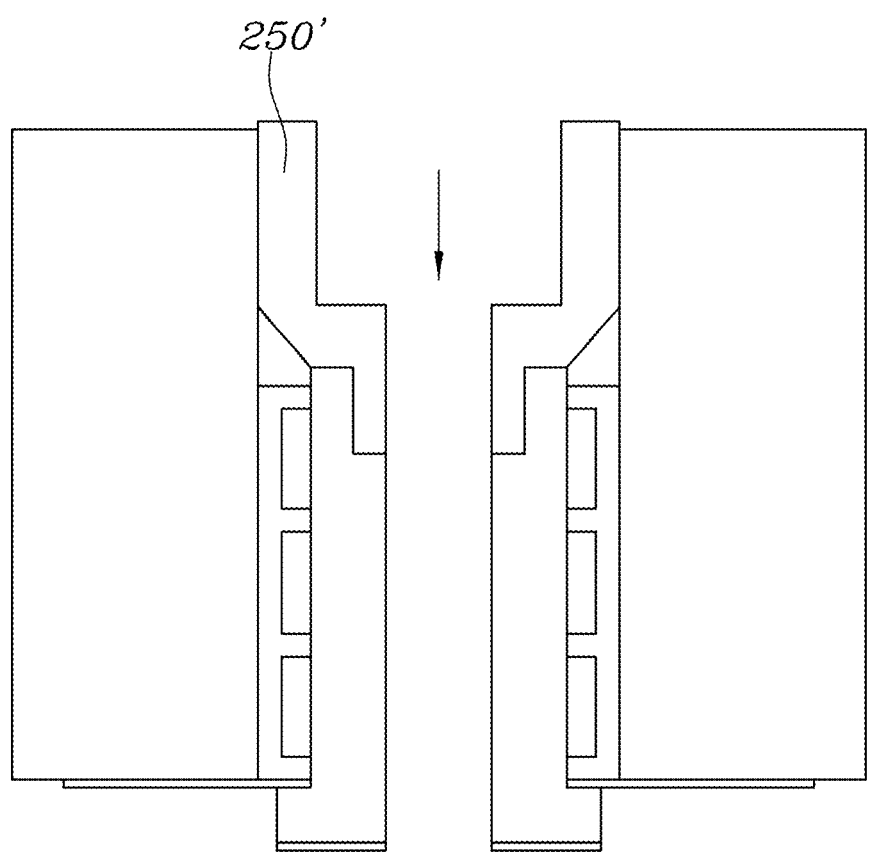
Figure 8:
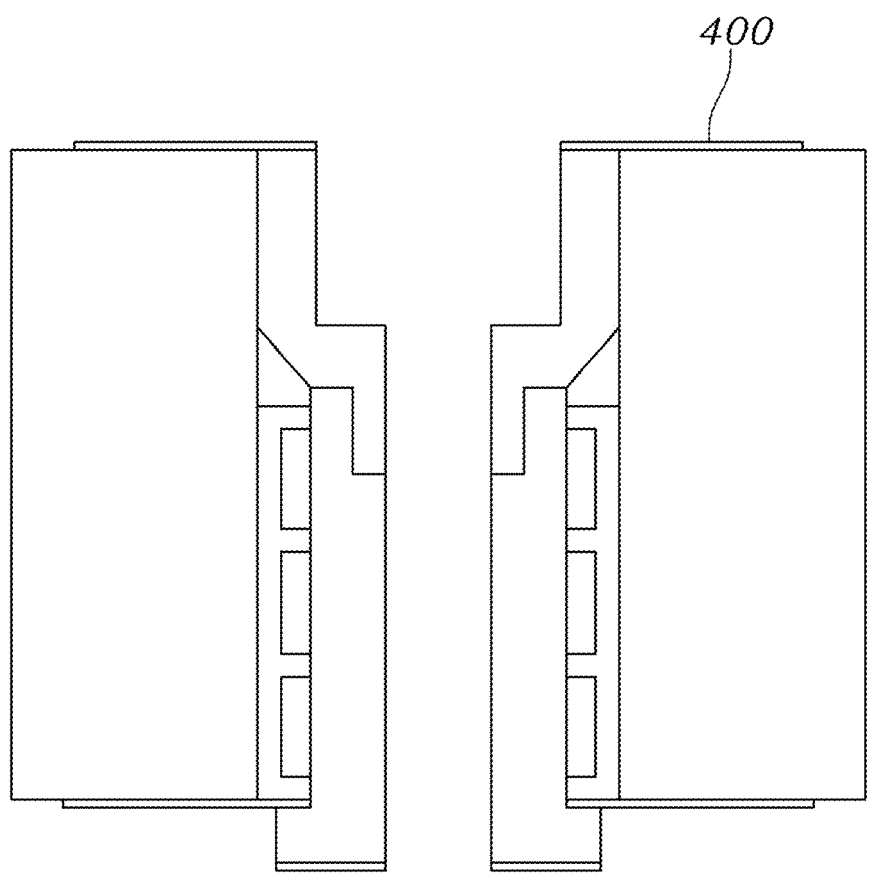
Figure 9:
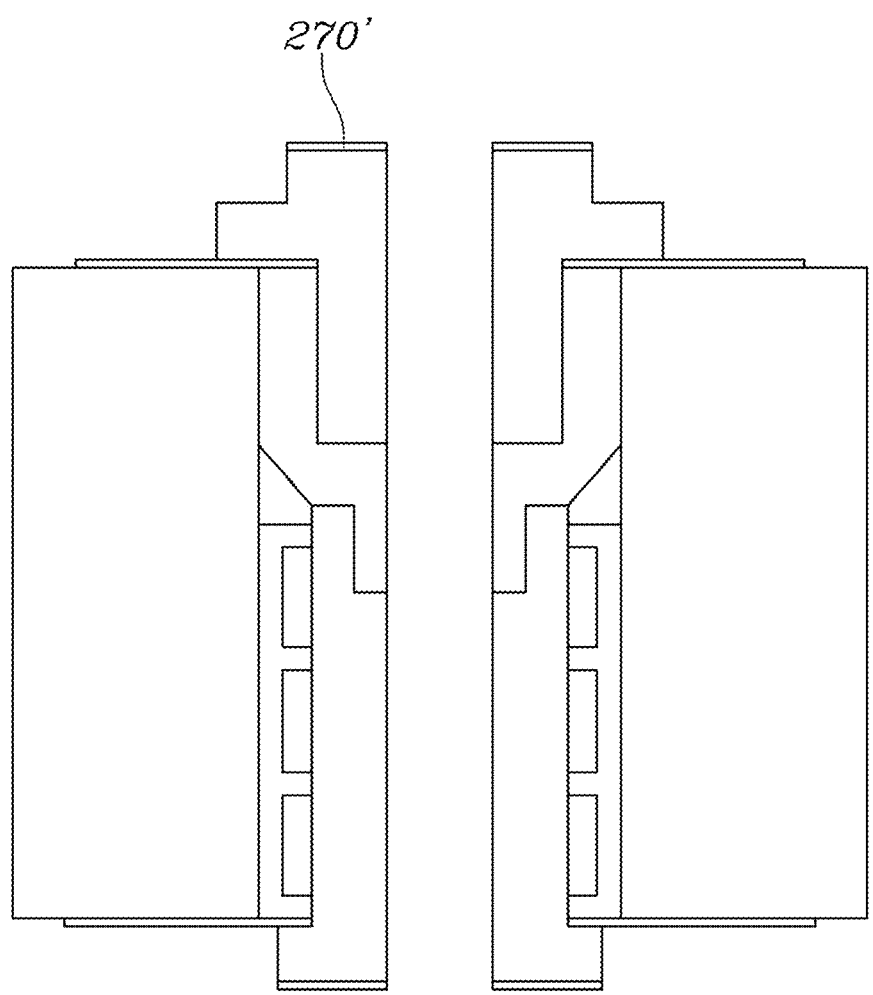

As illustrated in FIG. 4 and FIG. 5, the mounting portion 20' of the internal surface of the battery assembly may include a member 100 provided inside the battery assembly and a through pipe 200 inserted into the member and configured to accommodate the through bolt.

Meanwhile, a battery may be classified into a main battery and an auxiliary battery. The main battery includes a higher voltage and higher capacity than the auxiliary battery, includes a larger size than the auxiliary battery, and is mounted on the lower portion of a vehicle body. On the other hand, the auxiliary battery is a battery used to drive the BMS of the main battery or a low-voltage apparatus. The auxiliary battery includes a small size and includes a different mounting space for each vehicle.

In the case of the main battery, one task to be solved is to increase capacity while reducing overall weight or to improve the ratio of the capacity to weight by maintaining the capacity but reducing the overall weight.

Because the auxiliary batter is largely mounted in a leftover space of the vehicle body, it is difficult to mount the auxiliary battery when the mounting space is small. Accordingly, there is an increasing need to reduce the size of the auxiliary battery while maintaining the capacity of the auxiliary battery.

Accordingly, attempts are made to reduce the weight and size of a battery by reducing the size of the member, which occupies a significant volume in the battery assembly.

Figure 2:
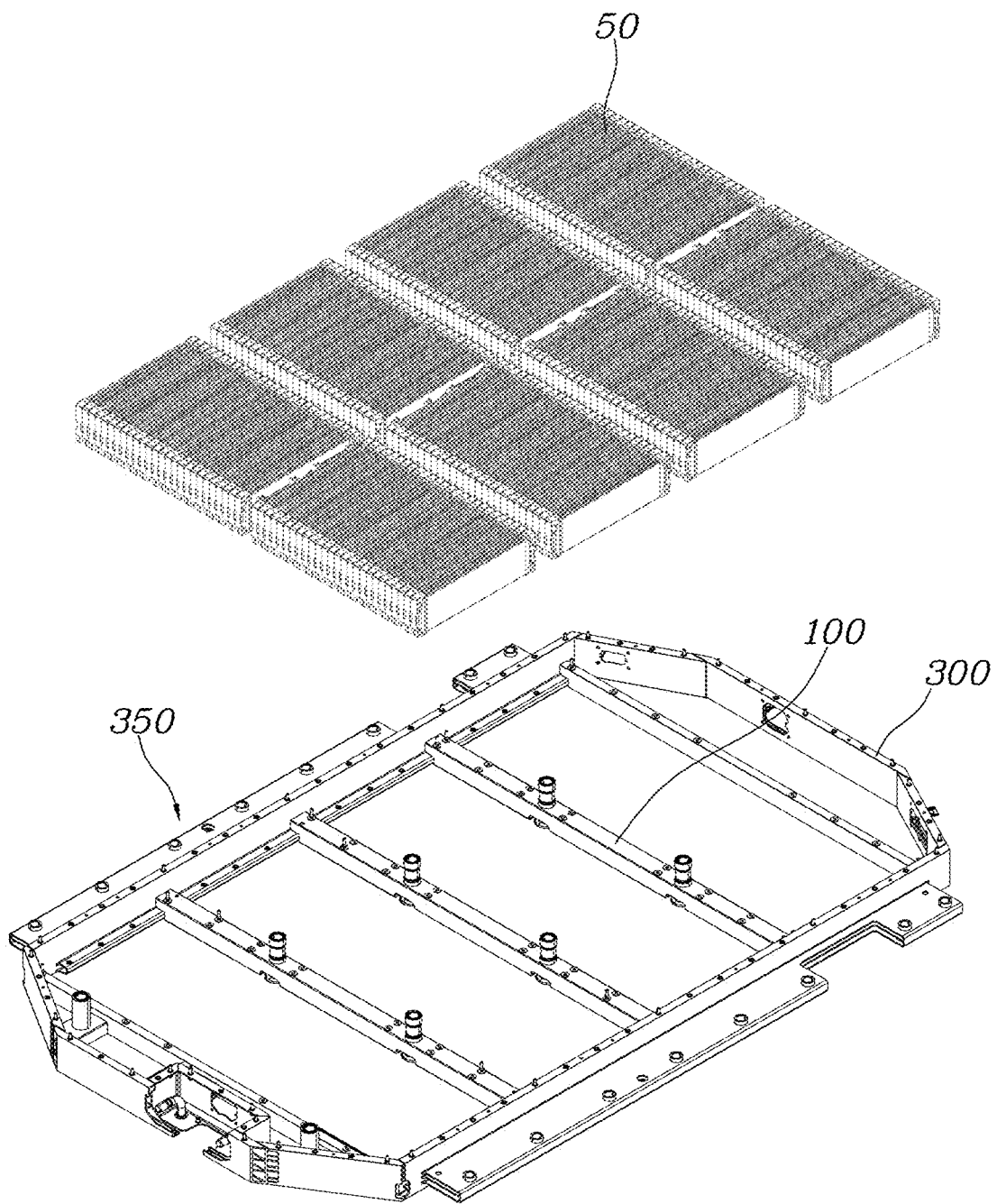
FIG. 2 illustrates the upper surface of the battery assembly.

FIG. 2 illustrates the upper surface of the battery assembly.

An internal space 350 in which the battery modules 50 are accommodated is formed in a housing 300 of the battery assembly, and the member 100 divides the internal space 350 into a plurality of spaces. The through bolt 30 is inserted into one point of the member 100 so that the battery assembly 10 may be mounted on the vehicle body.

Figure 3:
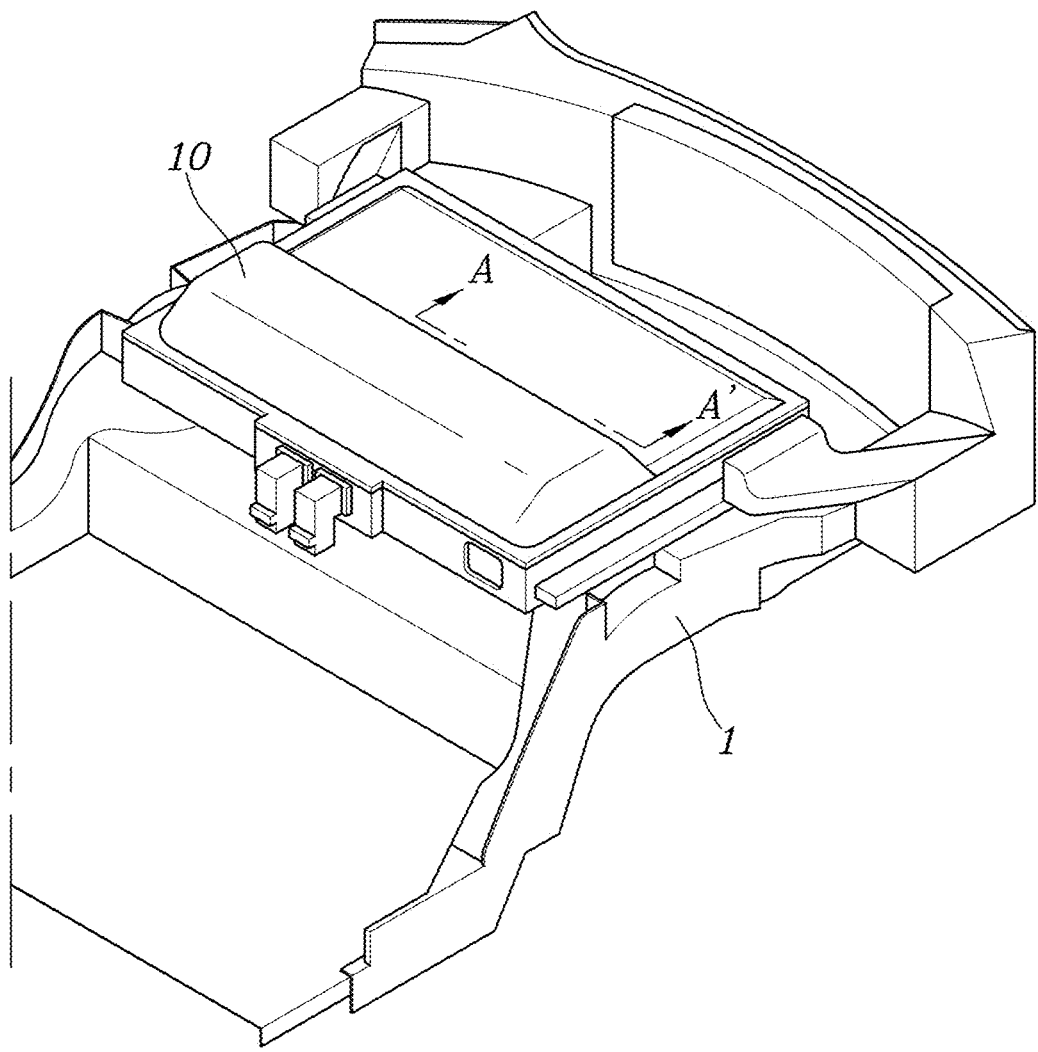
FIG. 3 illustrates the lower portion of a vehicle body on which the battery assembly is provided.

Meanwhile, FIG. 3 illustrates the lower portion of the vehicle body on which the battery assembly 10 is provided, and FIG. 4 illustrates a cross-section taken along line A-A' of FIG. 3.

Referring to FIG. 3, the battery assembly 10 may be mounted on the upper surface of a wheel frame 1 of the vehicle body on which wheels of a vehicle. In the instant case, the battery may be the auxiliary battery, and the auxiliary battery may be mounted by utilizing a leftover space in such a way.

Referring to FIG. 4, the through pipe 200 penetrating the inside of the member 100 vertically is inserted into one point of the member 100, and the through bolt 30 is inserted into the through pipe 200 so that the battery assembly 10 is fastened to the vehicle body.

In the instant case, the through bolt 30 may be inserted from the upper or lower side, and this is because direction in which the battery assembly 10 is fastened to the vehicle body may be different for each vehicle.

Meanwhile, the member 100 of the cross-section illustrated in FIG. 4 is configured to divide the internal space of the housing 300 of the battery assembly 10 and to increase the mechanical rigidity of the battery assembly 10. That is, the member 100 is located in a longitudinal or transverse direction to suppress the battery assembly 10 from being deformed by physical force in the event of a side or frontal collision of a vehicle.

A key objective of the present disclosure is to reduce the weight and size of the battery assembly 10 by reducing the width of the member 100. When the width of the member 100 is reduced according to the objective, the through pipe 200 and the through bolt 30 inserted into the member 100 may also be required to be reduced.

However, due to the reduction of the through pipe 200 and the through bolt 30, the fastening force of the battery assembly 10 to the vehicle body may be weakened, and when the structure of the conventional technology is adopted, the rigidity of the through pipe 200 maybe weakened, resulting in a problem of reducing safety.

That is, the through pipe 200 of the conventional technology includes a first member 230 and a second member 270 fastened to each other as illustrated in FIG. 4. When the width of the member 100 is decreased, the width of an internal peripheral surface 235 of the first member 230 and the width of an external peripheral surface 275 of the second member 270 fastened to the first member 230 are also decreased, reducing rigidity of the through pipe, and the size of the through bolt 30 is decreases, reducing fastening force.

While solving these problems, the present disclosure provides the structure of the battery assembly 10 in which the weight and size of the battery assembly 10 may be reduced.

FIG. 5 is a cross-section of the battery assembly according to the exemplary embodiment of the present disclosure. It may be seen that the width of the member 100 of FIG. 5 is reduced compared to the member 100 of FIG. 4. However, in an exemplary embodiment of the present disclosure, a through pipe 200 of the conventional technology including the first member 230 and the second member 270 is changed to include a first through member 230', a second through member 250', and a third through member 270'. The present disclosure provides the battery assembly 10 in which while the width of the member 100 is reduced, the size of the through bolt 30 is maintained so that the fastening force of the battery assembly 10 to the vehicle body may be maintained, and the second through member 250' is provided between the first through member 230' and the third through member 270' so that the rigidity of the through pipe 200' may be maintained.

Referring to FIGS. 2 and 5, the battery assembly 10 according to the exemplary embodiment of the present disclosure includes: the housing 300 including the internal space 350 in which the battery module 50 is accommodated: a plurality of members 100 dividing the internal space 350 of the housing 300; the through pipe 200' penetrating the inside of each of the members vertically on one point of the member 100; and the through bolt 30 inserted into the through pipe 200'.

Furthermore, the through pipe 200' includes: the first through member 230' penetrating the inside of the member 100 to be fastened to the member 100 and including a first internal peripheral surface 235' formed on an upper end portion thereof: the second through member 250' being fastened to the first internal peripheral surface 235' of the first through member 230' and including a second internal peripheral surface 255' formed on an upper end portion thereof, with the width of second internal peripheral surface 255' being greater than the width of the first internal peripheral surface 235', and the third through member 270' fastened to the second internal peripheral surface 255' of the second through member 250'.

The first through member 230' corresponds to the first member 230 of the conventional technology, and the third through member 270' corresponds to the second member 270 of the conventional technology. The second through member 250' is provided between the first through member 230' and the third through member 270' so that the width of a coupling surface between the third through member 270' and the second through member 250' may be maintained similarly to the width of a coupling surface between the first member 230 and the second member 270 of the conventional technology, and accordingly, while the width of the member 100 is reduced, the rigidity of the through pipe 200' may be maintained.

Furthermore, even though the width of the member 100 and the size of the external diameter of the through pipe 200 are reduced, the size of the through bolt 30 may be maintained as the size of a corresponding part of the conventional technology, so a coupling force between the battery assembly 10 and the vehicle body may be maintained as a coupling force between corresponding parts of the conventional technology.

Meanwhile, a seating surface 40 on which a head 35 of the through bolt 30 may be accommodated is formed on at least one of each of the lower end portion of the first through member 230' or the upper end portion of the third through member 270', and the through bolt 30 may be inserted into the through pipe 200' to first penetrate any one of the first through member 230' and the third through member 270'.

The battery assembly 10 may be coupled to the lower or upper surface of the vehicle body, and accordingly, the through bolt 30 may also be coupled to the vehicle body from the lower side of the vehicle body to the upper side thereof, or from the upper side of the vehicle body to the lower side thereof. That is, to easily mount the battery assembly 10 to a vehicle body according to the structure of the vehicle body, the seating surface 40 on which the head 35 of the through bolt 30 may be accommodated is formed on at least one of each of the lower end portion of the first through member 230' and the upper end portion of the third through member 270'.

Meanwhile, a first external peripheral surface 237' fastened to the member 100 may be formed on the upper end portion of the first through member 230'. Threads are formed on the first external peripheral surface 237' and the member contacting with the first external peripheral surface 237' so that the first through member 230' and the member 100 may be fastened to each other by rotation of the first through member 230'.

Likewise, threads are formed on the first internal peripheral surface 235' of the first through member 230' and the second internal peripheral surface 255' of the second through member 250' so that the first through member 230' and the second through member 250' may be fastened.

Meanwhile, a second external peripheral surface 257' including a width smaller than the width of the second internal peripheral surface 255' may be formed on a lower portion of the second through member 250' to be fastened to the first internal peripheral surface 235' of the first through member 230'. That is, due to the reduction of the size of the member 100, the width of the second external peripheral surface 257' and the width of the first internal peripheral surface 235' are reduced, but the width of the second internal peripheral surface 255' coupled to the external peripheral surface 275' of the third through member 270' is maintained similarly to the width of a corresponding portion of the conventional technology, and accordingly, the third through member 270' is fastened to the second through member 250' so that the rigidity of the through pipe 200 may be maintained as the rigidity of a corresponding portion of the conventional technology.

In other words, a third external peripheral surface 277' including a width greater than the width of the second external peripheral surface 257' is formed on a lower portion of the third through member 270' to be fastened to the second internal peripheral surface 255' of the second through member 250'.

In an exemplary embodiment of the present disclosure, threads are formed on an external peripheral surface of the second through member 250' and the member contacting with the externa peripheral surface of the second through member 250' so that the second through member 250' and the member 100 may be fastened to each other by rotation of the third through member 270'.

Meanwhile, an upper cover 400 covering the battery module 50 may be provided between the second through member 250' and the third through member 270'.

The upper cover 400, which is one component forming the battery assembly 10, is located on the upper end portion of the battery module 50 and may protect the battery module 50 from external impact or foreign matter and may protect a wire electrically connecting the battery module 50.

Meanwhile, FIG. 6, FIG. 7, FIG. 8, and FIG. 9 illustrate the assembly process of the through pipe according to the exemplary embodiment of the present disclosure.

Referring to FIG. 6, FIG. 7, FIG. 8, and FIG. 9, the first through member 230' is fastened to the member from the lower side to the upper side thereof. Next, the second through member 250' is fastened to the first through member 230' from the upper side to the lower side thereof. Next, the upper cover 400 is assembled with the upper end portion of the second through member 250', and the third through member 270' is fastened to the second through member 250'.

In the present manner, the through pipe 200' is inserted into the member 100, and the through bolt 30 is inserted into the through pipe 200' from the upper or lower side to be rotated so that the battery assembly 10 may be fixed to the vehicle body.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B".

In addition, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery assembly comprising:
a housing including an internal space in which a battery module is accommodated;
a plurality of members dividing the internal space of the housing into a plurality of spaces;
a through pipe penetrating inside of each of the members on a point of a corresponding member and mounted to the corresponding member; and
a through bolt inserted into the through pipe,
wherein the through pipe includes:
a first through member penetrating the inside of the member to be fastened to the member and including a first internal peripheral surface formed on an upper end portion of the first through member;
a second through member being fastened to the first internal peripheral surface of the first through member and including a second internal peripheral surface formed on an upper end portion of the second through member, with a width of the second internal peripheral surface being greater than a width of the first internal peripheral surface; and
a third through member fastened to the second internal peripheral surface of the second through member.

2. The battery assembly of claim 1, wherein a seating surface on which a head of the through bolt is accommodated is formed on at least one of a lower end portion of the first through member and an upper end portion of the third through member.

3. The battery assembly of claim 2, wherein the through bolt is inserted into the through pipe to first penetrate one of the first through member and the third through member.

4. The battery assembly of claim 1, wherein a first external peripheral surface fastened to the member is formed on the upper end portion of the first through member.

5. The battery assembly of claim 1, wherein a second external peripheral surface including a width smaller than the width of the second internal peripheral surface is formed on a lower portion of the second through member to be fastened to the first internal peripheral surface of the first through member.

6. The battery assembly of claim 1, wherein a second external peripheral surface of the second through member is formed on a lower portion of the second through member.

7. The battery assembly of claim 6, wherein a third external peripheral surface having a width greater than the width of the second external peripheral surface is formed on a lower portion of the third through member to be fastened to the second internal peripheral surface of the second through member.

8. The battery assembly of claim 1, wherein an upper cover covering the battery module is provided between the second through member and the third through member.

9. The battery assembly of claim 1, wherein threads are formed on the first internal peripheral surface of the first through member and the second internal peripheral surface of the second through member.

10. The battery assembly of claim 9, wherein threads are formed on a first external peripheral surface of the first through member and the members.

11. The battery assembly of claim 9, wherein threads are formed on an external peripheral surface of the second through member and the members.

12. The battery assembly of claim 1, wherein the first through member, the second through member, and the third through member are coupled to each other to form the through pipe.

13. An apparatus of coupling a set of battery modules to a vehicle body, the apparatus comprising:
a through pipe configured to penetrate inside of each of members of a battery assembly into which the set of battery modules is mounted;
a through bolt inserted into the through pipe,
wherein the through pipe includes:
a first through member including a first internal peripheral surface formed on an upper end portion of the first through member and configured to penetrate the inside of the members to be fastened to the members;
a second through member being fastened to the first internal peripheral surface of the first through member and including a second internal peripheral surface formed on an upper end portion of the second through member, with a width of the second internal peripheral surface being greater than a width of the first internal peripheral surface; and
a third through member fastened to the second internal peripheral surface of the second through member.

14. The apparatus of claim 13, wherein a seating surface on which a head of the through bolt is accommodated is formed on at least one of a lower end portion of the first through member and an upper end portion of the third through member.

15. The apparatus of claim 13, wherein a first external peripheral surface fastened to the members is formed on the upper end portion of the first through member.

16. The apparatus of claim 13, wherein a second external peripheral surface including a width smaller than the width of the second internal peripheral surface is formed on a lower portion of the second through member to be fastened to the first internal peripheral surface of the first through member.

17. The apparatus of claim 13, wherein a second external peripheral surface of the second through member is formed on a lower portion of the second through member.

18. The apparatus of claim 17, wherein a third external peripheral surface having a width greater than a width of the second external peripheral surface is formed on a lower portion of the third through member to be fastened to the second internal peripheral surface of the second through member.

* * * * *